(12) United States Patent
Miloslavsky (10) Patent No.: US 6,229,888 B1
(45) Date of Patent: *May 8, 2001

(54) SYSTEM AND METHOD FOR OPERATING A PLURALITY OF CALL CENTERS

(75) Inventor: Alec Miloslavsky, Hillsborough, CA (US)

(73) Assignee: Genesys Telecommunications Laboratories, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/337,955

(22) Filed: Jun. 22, 1999

Related U.S. Application Data (62) Division of application No. 08/782,983, filed on Jan. 14, 1997, now Pat. No. 5,915,012.

(51) Int. Cl.[7] ............................................. H04M 7/00
(52) U.S. Cl. ........................... 379/265; 379/220; 379/309
(58) Field of Search ................................... 379/265, 266, 379/220, 221, 207, 210, 211, 212, 201, 309

(56) References Cited

U.S. PATENT DOCUMENTS

| | | | |
|---|---|---|---|
| 4,567,323 | * | 1/1986 | Lottes et al. .......................... 379/265 |
| 5,469,504 | * | 11/1995 | Blaha .................... 379/265 |
| 5,506,898 | * | 4/1996 | Costantini et al. .................... 379/266 |
| 5,530,744 | * | 6/1996 | Charalambous ..................... 379/265 |
| 5,590,188 | * | 12/1996 | Crockett ............................... 379/266 |
| 5,675,637 | * | 10/1997 | Szlam et al. .......................... 379/265 |
| 5,684,870 | * | 11/1997 | Maloney et al. ...................... 379/265 |
| 5,740,238 | * | 4/1998 | Flockhart et al. .................... 379/265 |
| 5,757,904 | * | 5/1998 | Anderson ............................... 379/265 |
| 5,825,869 | * | 10/1998 | Brooks et al. ......................... 379/265 |
| 5,828,747 | * | 10/1998 | Fisher et al. .......................... 379/266 |
| 5,915,012 | * | 6/1999 | Miloslavsky ........................ 379/220 |
| 5,963,635 | * | 10/1999 | Szlam et al. .......................... 379/266 |

OTHER PUBLICATIONS

Newton's Telecom Dictionary, Harry Newton, 1998, pp. 684–685, Oct. 1998.*

* cited by examiner

Primary Examiner—Ahmad Matar
Assistant Examiner—William J. Deane, Jr.
(74) Attorney, Agent, or Firm—Donald R Boys; Central Coast Patent Agency (57) ABSTRACT

A system and method for routing telephone calls from a network-level routing station to individual ones of a plurality of call centers having computer telephony integration (CTI) servers at each call center for monitoring and controlling telephony switches at the call centers and at the network level. A separate data network interconnects the network-level CTI server and the call-center-level CTI servers. The system also includes a stat-server at the network level for storing status information related to all of the telephony switches, and a router at the network level. Routing of incoming calls at the network to the connected call centers is successfully accomplished wherein each of the CTI servers report status of call traffic at the connected telephony switches to the network level stat-server, and the network-level router routes calls to the call centers based on the information in the network-level stat-server.

The present invention provides a needed capability in the art for larger companies requiring several call centers to have uniform control of the routing of calls from the network, to, and between, the call centers. It is desirable that information and resources of all these call centers be shared, not only for accurate routing, but also, the calls received in one call center can be handled by agents in another call center. Thus, the potential of these call centers can be fully utilized.

5 Claims, 5 Drawing Sheets

SYSTEM AND METHOD FOR OPERATING A PLURALITY OF CALL CENTERS

CROSS-REFERENCE TO RELATED DOCUMENTS

The present application is a Divisional of Ser. No. 08/782,983, now the U.S. Pat. No. 5,915,012 filed on Jan. 14, 1997 by the same inventor.

FIELD OF THE INVENTION

This invention relates to telephone communications, and particularly to methods and systems for centrally managing a plurality of geographically separated call centers.

BACKGROUND OF THE INVENTION

The telephone is one of the most widely used communication equipment in the world. At first, it was merely a convenient tool to allow people to communicate while they are physically separated. Recently, many companies use telephones to market products and services, provide technical supports to consumer products, allow callers to access their own financial data, etc. Thus, the telephone is becoming a major business and marketing tool.

In order to more effectively use telephone for business and marketing purposes, call centers have been developed. In a call center, a large number of agents handle telephone communication with callers. The matching of calls between callers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the caller who has been assigned that phone number. The software can now route the call to an agent who can best handle the call based on predefined criteria (e.g., language skill, knowledge of products the caller bought, etc.). The software immediately transfers relevant information to a computer screen used by the agent. Thus, the agent can gain valuable information about the caller prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In a prior art call center architecture, each call center is a self-contained unit. Typically, it has a telephone switch (e.g., automatic call distributor and private branch exchange), a software module for selecting agents based on a predefined script, one or more databases containing information on agents, calls, statistics, and customers, and means for routing an incoming and related data to a selected agent. This single call center system works well when a small company wants to set up only one call center. However, as the size and requirements of a company increase, there is a need to set up multiple call centers. It is desirable that information and resource of all these call centers be shared and that calls received in one call center can be handled by agents in another call center. If each call center is set up according to the prior art call center architecture, there is little or no sharing of resource and information between the call centers. Thus, it is very difficult to know whether there is an agent in another call center who is best able to handle a call received by a call center. Consequently, the full potential of these call centers cannot be fully utilized.

SUMMARY OF THE INVENTION

The present invention involves an architecture and a system for routing calls in call centers. This architecture and system allow information and resource of all the call centers to be shared. As a result, the calls can be routed to the agents most qualified to handle them.

The present architecture is a three-layer CTI architecture. The first layer contains a plurality of automatic call distributors. Each call center contains at least one of the call distributors. Because these distributors may be manufactured by different vendors, they may have different properties and different mode of operation. In order to provide a uniform interface to the other layers, each automatic call distributor is matched with a software module (called herein the "CTI server"). This CTI server monitors and interacts with the automatic call distributor while communicating with the other layers through a common application programming interface (API). Thus, status information of all the automatic call distributors made by different vendors can be easily sent to software of the other layers using the API, and software in the other layers can control the operations of the automatic call distributors using the API.

In this architecture, the second layer comprises a software module (called herein the "stat-server") for storing status information related to the operation of all the call centers, such as the status of the automatic call distributors and agents working in these call centers. The stored information can be retrieved by software modules in the third layer.

The third layer comprises one or more applications (i.e., software modules). An important application is a routing server for routing an incoming call (received by one of the call centers) to the best available agent (who may be physically located in another call center).

An example of a system using the architecture of the present invention is a multiple call center's system. An incoming call arrives at an automatic call distributor of a first call center. The CTI server sends the information (using API events) to the stat-server and the routing server. The routing server retrieves information regarding the call (e.g., previous ordering information originated from the phone placing the call) from a database and the status of agents from the stat-server. If the best available agent to handle the call is located in a second call center, the routing server requests the CTI server of the second call center to reserve a routing point in its matching automatic call distributor. The routing server then instructs the CTI server of the first call center to cause its matching automatic call distributor to transfer the call to the reserved routing point of the automatic call distributor in the second call center. After the call is transferred, the CTI server of the second call center notifies the routing routine. The routing routine routes this call to the selected agent in the second call center. The routing routine also delivers information from the database to a workstation used by the agent. As a result, the best available agent is able to handle the call and all pertinent information delivered thereto.

These and other features of the present invention will become apparent from the following description when read in conjunction with the accompanying drawings.

DETAILED DESCRIPTION OF THE INVENTION

The present invention comprises a novel call center architecture and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
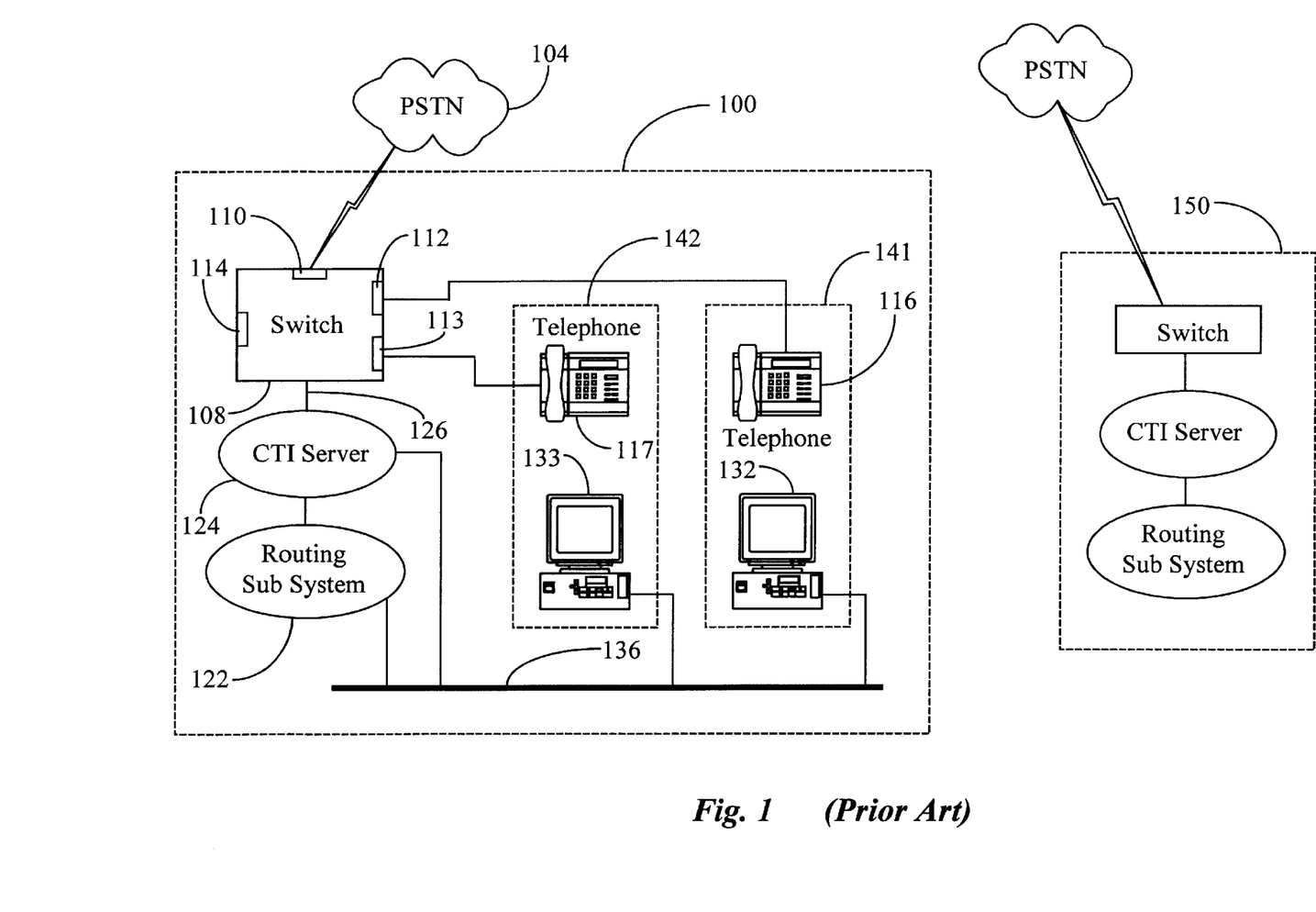
FIG. 1 is a block diagram of a prior art call center architecture.

FIG. 1 shows a schematic diagram of a prior art system having call centers in separate geographic locations. As explained below, the operations of these call centers are not integrated, thereby leading to inefficient use of resources.

FIG. 1 shows two call centers 100 and 150 out of a plurality of call centers. Because the structure of these call centers are similar, only one of them (center 100) will be described in detail. Call center 100 is connected to a public-switched telephone network (PSTN) 104. It comprises a switch 108 for accepting calls from PSTN 104. Switch 108 could be an automatic call distributor (ACD)/private branch exchange (PBX) or a PSTN switch. Switch 108 contains a high bandwidth port 110 (for connecting to PSTN 104) and a plurality of low bandwidth ports (such as ports 112–114). Some of these low bandwidth ports can be connected to voice-based devices. For example, ports 112–113 is connected to telephones 116–117, respectively. Agents are assigned to handle these telephones. Each of the low bandwidth ports is assigned one or more directory numbers (DN").

It has been found that the function performed by a standard switch is rather limited and cannot meet the requirements of a typical call center. For example, it is desirable to provide information about a call to a workstation (such as workstation 132–133) available to each agent. The telephone and a corresponding workstation form an integral unit (such as units 141 and 142) to serve a call. However, a switch cannot search, process and route data to these workstations. Consequently, a new technology, called computer-telephony-integration (CTI), is needed to route a combination of voice and digital data to desired places.

As a way to implement CTI, call center 100 further contains a routing subsystem 122 connected to a CTI server 124, which is in turn connected to switch 108 through a CTI link 126. The communication between switch 108 and server 124 typically follows the X.25 protocol. CTI server 124 can be considered an interfacing software which allows routing subsystem 122 to interact in a consistent manner with switch 108 (which may be made by one of several vendors). Switch 108 notifies CTI server 124 when a call is received. CTI server 124 sends the information to routing routine 122, which selects an agent best qualified to answer the call in accordance with predetermined criteria. CTI server 124 then notifies switch 108 to direct the call to the telephone of the selected agent while routing subsystem 122 directs data relating to the person placing the call to the workstation of the selected agent.

In order to facilitate data communication, a communication network 136 is used to digitally connect routing subsystem 122, CTI server 124 and workstation's 132–133.

As can be seen in FIG. 1, prior art call centers contain separate switch, CTI servers, and routing subsystems. The problem with this architecture is that routing can only be performed locally. Thus, even if there is an agent best suitable to handle a call, the call cannot be routed to this agent if he/she is located in another call center.

Figure 2:
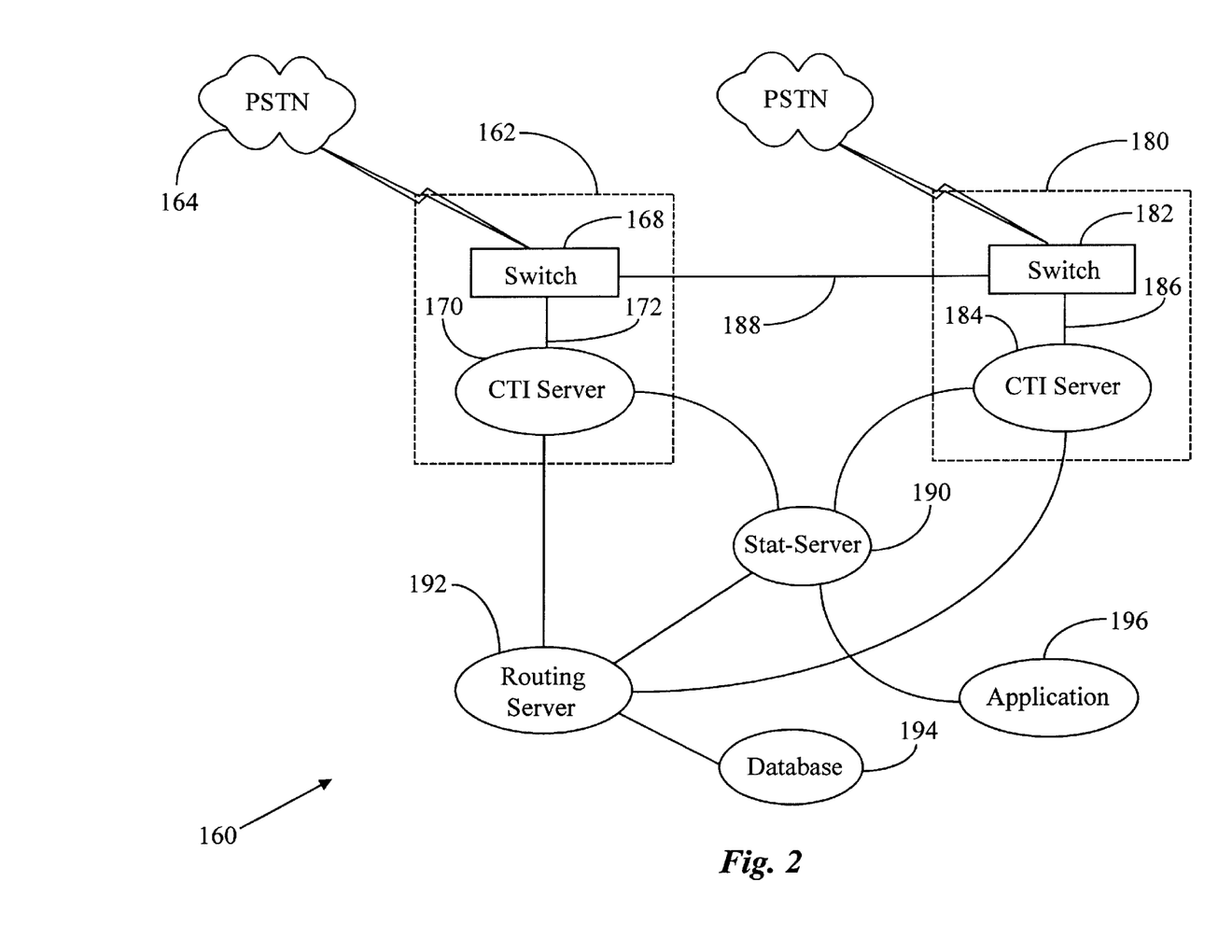
FIG. 2 is a block diagram of a multiple call center's architecture of the present invention.

FIG. 2 is a schematic diagram showing a global call center architecture 160 in accordance with the present invention. This architecture allows routing of calls received by one call center to an agent located in a geographically separated call center. Digital data related to the calls (e.g., customer and ordering information related to telephones which originate the calls) is also routed to the agent. As a result, the resources of these call centers can be better utilized.

As an example to illustrate the advantages of the global call center architecture, a call center may be temporarily swamped with calls, and thus need to direct calls to other call centers that are relatively quiet. The global call center architecture of the present invention can direct the calls to an appropriate agent in another call center, thereby fully utilizing the resources of the call centers.

Another advantage of the present architecture is that it allows different call centers to maintain specialized resources. There are good reasons why specialized resources can be better acquired by different call centers. For examples, call centers that are close to universities or high-tech areas would be in a better position to hire agents who can provide technical information to customers. Similarly, call centers located in metropolitan areas around the coastal areas would be in a better position to hire agents having foreign language skills. Thus, calls which require these specialized resources but initially received by a call center located away from the above-mentioned areas are likely to find the best qualified agent located in one of these call centers. The present inventions allow these calls to be routed to the best qualified agent in these specialized call centers.

Yet another advantage of the architecture shown in FIG. 2 is that all the information can be centrally managed. As a result, the information in a database can be easily updated and maintained. In contrast, if each call center maintains its own database, it would be difficult to enforce data integrity.

FIG. 2 shows two call centers 162 and 180 out of a plurality of call centers. The structure of only one call center (center 162) is described in detail here because all the call centers have similar structure. Call center 162 contains a switch 168 that is similar to the switch 108 of FIG. 1. Switching 168 could be an automatic call distributor (ACD)/private branch exchange (PBX) or a PSTN switch. Switch 168 contains a high bandwidth port (not shown) for connecting to a PSTN 164 and a plurality of low bandwidth ports (not shown) for connecting to voice-based devices (such as telephones). Agents are assigned to handle these telephones. Each of the low bandwidth ports is assigned one or more directory numbers. Agents are also provided with workstations (not shown) for displaying callers (and other) information.

Call center 162 contains a CTI server 170 that is connected to switch 168 through a CTI-link 172. Up to this point, call center 162 is similar to call center 100 of FIG. 1. However, in the present architecture, the routing subsystem is not considered part of the call center.

Similarly, call center 180 contains a switch 182 and a CTI server 184 linked by a CTI-link 186. Switches 168 and 182 in call centers 162 and 180, respectively, are connected by a tie line 188.

It should be noted that switch 168 and CTI server 170 do not have to be located in the same physical area. The present invention does not impose any condition on the length of CTI link 172.

Global call center 160 contains a single stat-server 190 to gather statistical information of all the call centers. It also contains a routing server 192 for selecting appropriate agents using data in stat-server 190 (and from other databases). Stat-server 190 collects and stores historic data relating to all calls, activities of switches, and information and activities of all agents and telephones in all the call centers.

One aspect of the present invention is a three-layer architecture in which a first layer comprises a plurality of switches and their matching CTI servers. The switches could be manufactured by different vendors. Each switch has a different capability and interface procedure. The matching CTI server is a routine which communicates and controls an associated switch one hand and, at the other hand, presents a common interface to the second and third layers. The second layer communicates with all the CTI servers in the first layer and all applications in the third layer. The third layer contains one or more applications which use the information contained in the second layer. In this embodiment, the second layer accumulates statistics on all aspects of the operation of the call centers, such as the agents and all activities of the automatic call distributors. The second layer provides this statistics to various applications in the third layer.

Stat-server 190, routing server 192, database, 194, and an applications server 196 in this example make up a network-level routing station, as labeled in FIG. 2. Communication between the routing station and call centers 162 and 180 is via a communication network separate from telephone trunk lines. Lines labeled CN in FIG. 2 are parts of this communication network.

In a preferred embodiment, various entities in a call center are associated with software objects. The following are some examples of these objects:

(a) Queues and Routing Points: These are hardware circuits in switches and are represented as objects. Queue implements hardware controlled ACD mechanism. Routing points, sometimes called control directory number (CDN), can be controlled by external software applications (such as a routing routine).

(b) Agent DNs: They are hardware ports in a switch and are represented as objects. Each DN is associated with one or more properties. For example, some DNs can access another DN directly; some DNs are associated with queues; some DNs are limited to outgoing calls; and some DNs have a period of unavailability after completion of a previous call. In a specific example, some of the switches manufactured by Northern Telecom contain basically two kinds of DNs, position and extension. Extension DNs can be accessed directly by a telephone and can initiate outgoing calls. Position DNs are associated with one or more queues. They can be accessed only through these queues and cannot initiate outgoing calls.

(c) Agent Places: They are logical spaces each containing items associated with the space (e.g., one or more DNs, possibly attached to different switches, and workstations). In a physical implementation, these places could be desks. When an agent makes login to one item in a place, he (she) becomes logically logged in for the whole place. Each place is represented as an object and associated with a PlaceID.

(d) Agents: Persons (objects) identified by an AgentID. Agents can move between places dynamically. The stat-server has a special routine for dynamically keeping track of the locations of all the agents. For example, an agent can work from 9:00 A.M. till 13:00 (i.e., 1:00 P.M.) at a first place; makes a logout (e.g., for lunch) and then makes a login at a second place at 14:00. The agent location tracking routine maintains the information so that the routing server (and other applications) knows which DN to dial to reach the agent. Each agent may also have a "home place," which is a default value if the agent cannot be dynamically tracked.

(e) Groups: A number of agents in any combination. Group objects are identified by GroupIDs. There are at least two types of groups. The first type (identified herein as SObjectGroupAgents) contains a list of AgentIDs. In this case, the stat-server tracks all agent movements and collect statistics only for included agents. Examples are groups with particular skills. The second type (identified herein as SObjectGroupPlaces) contains a list of agent places (PlaceIDs). Examples of places in the lists are training room, main office, second floor, etc. In this case, the stat-server tracks events related to places included in the list because it does not matter who works in these places.

Figure 3:
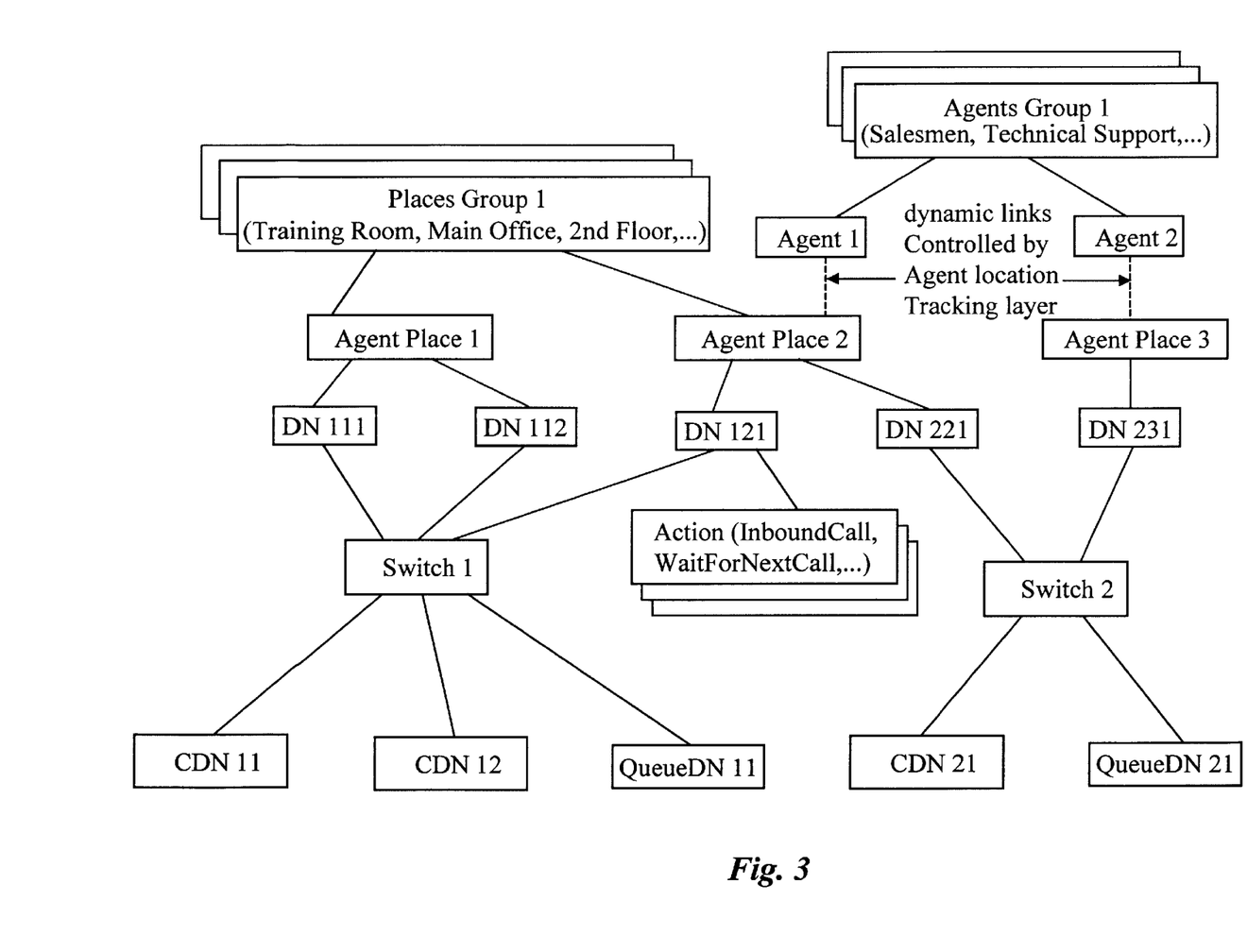
FIG. 3 is a schematic diagram showing illustrating objects used in a stat-server of the multiple call centers system of the present invention.

FIG. 3 is used to illustrate the above described objects. It shows two switch objects 212 and 213, one represents switch 168 and the other represents switch 182. Switch object 212 comprises the following resources: CDN objects 214 and 215, queueDN object 216, and DN objects 217–219. These objects represent the corresponding CDN, queues, and agent DNs in switch 168. Similarly, switch object 213 comprises the following resources: CDN object 221, queueDN object 222, and DN objects 223–224. These objects represent the corresponding CDN, queues, and agent DNs in switch 182.

The agent DN objects 217–219 and 223–224 are also included in agent place objects. In this example, agent place object 226 includes DN objects 217 and 218, agent place object 227 includes DN objects 219 and 223, and agent place object 228 includes DN object 224. It should be noted that the DNs from two different switches can be associated with the same agent place.

Some of the agent place objects can be grouped together to form place group objects. In FIG. 3, only one place group object 232 is shown.

FIG. 3 also shows a plurality of agent objects, such as objects 230 and 231. In this example, agent object 230 is dynamically linked to agent place object 227 using the above mentioned agent location tracking routine, shown in FIG. 3 as a dashed line 235. Similarly, agent object 231 is dynamically linked to agent place object 228 using an agent location tracking layer, shown as a dashed line 236.

Some of the agent objects can be grouped into agent group objects. In FIG. 3, only one agent group object 233 is shown.

Stat-server 190 provides a set of application programming interfaces (APIs) for its clients to obtain statistics for various objects, such as objects associated with agents, agent groups, places, place groups, route points, queues, etc.

Statistics could be current objects states representation (e.g., current agent status, current number of active calls in a group, etc.) or historical states representation. Historical representation are accumulated information for certain time intervals (e.g., total number of calls, total talk time, average talk time, etc.). Thus, the clients have to specify the time interval of interest. Examples of time intervals are:

(a) SFixedStartSlidingEnd: The start time is fixed (e.g., 9:00 A.M.) while the end time is sliding (e.g., "till now"). For example, the client may request the total number of calls between 9:00 A.M. and now.

(b) SFixedStartFixedEnd: Both the start and end times are fixed.

(c) SFixedLengthSlidingEnd: The time interval is fixed while the start and end times are sliding. Example: the average call length for the past hour.

Global call center 160 also contains a routing server 192 for selecting agents and places and causing the switches to route calls thereto. Routing server 192 requests statistical information on objects of interest from stat-server 190. Routing server 192 also has access to a separate database 194 containing other relevant information, such as information relating to customers and agents in all the call centers in global call center 160. Using information from stat-server 190 and database 194, routing server 192 selects (using a software algorithm) the best agent for a specific call.

As explained in FIG. 3, the statistics of many objects are tracked by stat-server 190. One of the reasons for creating these objects is that routing server 192 typically requests information in the form of agents, agent groups, agent places and place groups. On the other hand, the CTI server sends to stat-server 190 information about DNs and CDNs of their associated switches. These objects allow stat-server 190 to easily communicate with various clients that can access it.

Figure 4A:
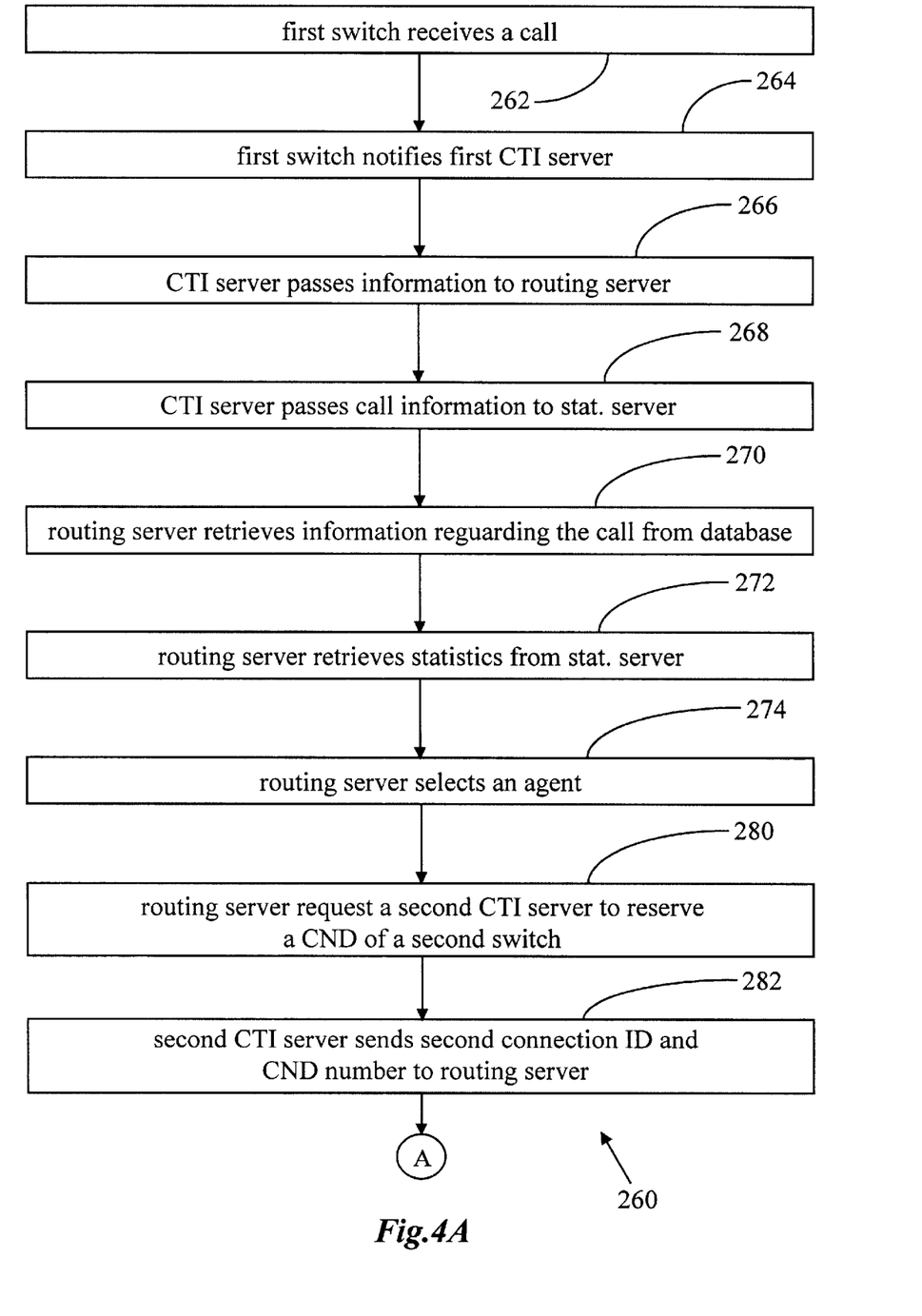
FIGS. 4A and 4B (in combination) is a flow diagram showing the operation of a multiple call centers system in accordance with the present invention.
Figure 4B:
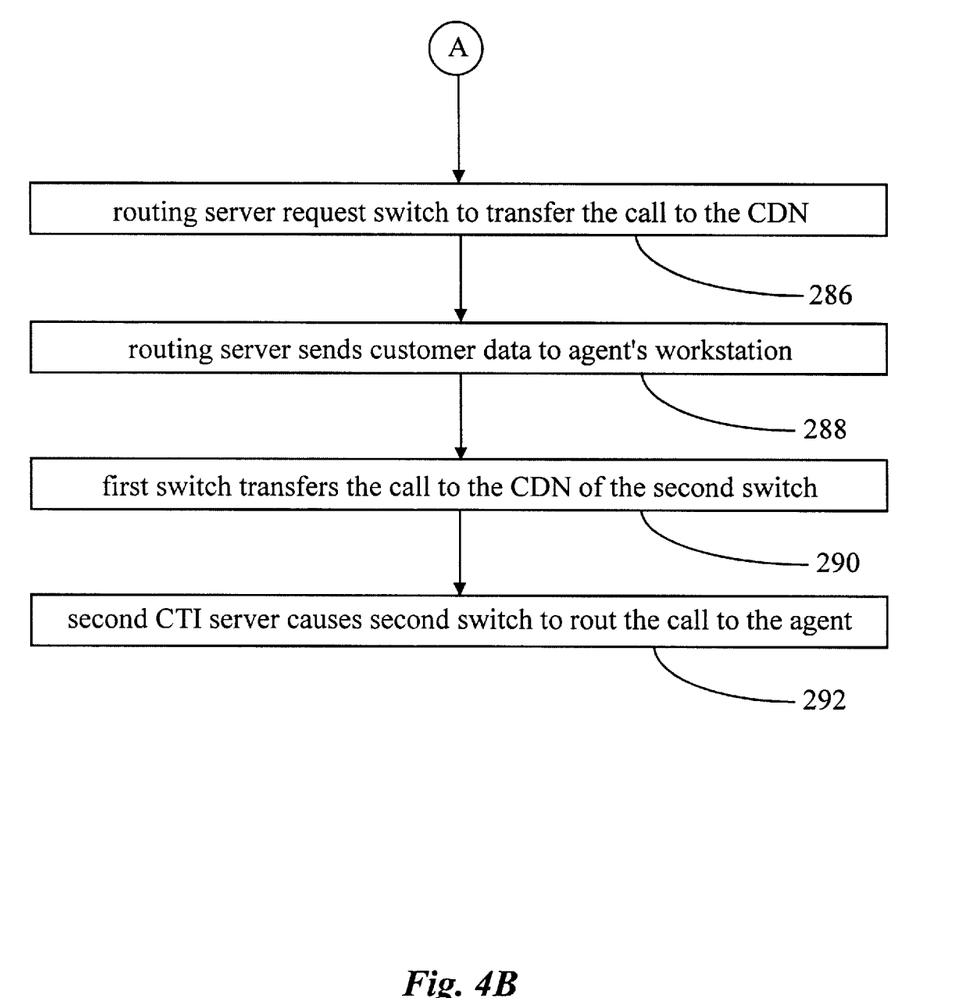

The operation of global call center 160 is now described using a flow chart 260. FIGS. 4A and 4B is used to illustrate the flow chart. In this example, it is assumed that a call is received by a CDN of switch 168 (step 262) of call center 162 while the best suitable agent is located in call center 180. Instead of routing the call itself, switch 168 notifies CTI-server 170 of this event (step 264). CTI server 170 assigns a unique connection identification to this call (call herein as the first connection ID, for convenience), and pass this ID together with other information about this call, such as its "automatic number identification" (ANI) and (if applicable) "dial number identification system" (DNIS), to routing server 192 (step 266). The ANI uniquely identifies the telephone line which originates the call while the DNIS uniquely identifies the toll-free 800-number dialed by a telephone. CTI server 170 also notify stat-server 190 that a call has been received (step 268) The connection ID, ANI, DNIS and other CTI-related parameters are also passed to the stat server 190.

Routing server 192 then sends API commands to database 194 to request relevant information relating to this call (step 270). For example, if a call originates from a telephone having a certain ANI, routing server 192 asks database 194 to retrieve information about persons related to this telephone. The details of a special API structure, called a "status priority table," is described in detail in a separate patent application entitled "Method and System for Determining and Using Multiple Object States in a Computer Telephony Integration System." This table allows an application to define the priority of various states of an object (e.g., the DN object). The stat-server 190 can provide statistics to the requesting application in accordance with the predefined priority.

Assuming that the retrieved information indicates that the mother tongue of the persons is French, routing server 192 tries to look for an agent who knows French. Routing server 192 then request statistics of all agents who know French from stat-server 190 (step 274). In step 274, routing server 192 selects an agent based on this statistics using a predetermined criteria (e.g., how many calls have been handled by an agent, the length of time an agent has been waiting for calls, etc.).

In this example, it is assumed that the selected agent is located in call center 180. Thus, routing server 192 needs to (i) cause the call to be routed to an appropriate DN associated with the selected agent and (ii) route relevant customer information from database 194 about this call to a workstation associated with the selected agent. The method for achieving the routing is described below.

In step 280, routing server 192 sends a command to CTI server 184 in call center 180 requesting reservation of a CDN in switch 182. This CDN will be used to accept a call from switch 168. CTI server 184 assigns a second connection ID to this upcoming call. It then sends the CDN and second connection ID to routing server 192 (step 282).

Upon receiving the information, routing server 192 sends a command to CTI server 170 of call center 162 to cause switch 168 to transfer the call to the specified CDN of switch 182 of call center 180 (step 286). This command includes the first connection ID, thereby allowing CTI server 170 to associate this command with the call of interest. Routing server 192 also sends customer information (retrieved from database 194) to a workstation associated with the selected agent (step 288).

Switch 168 transfers the call to the specified CDN of switch 182 via tie line 188 (step 290). Upon receiving the call, switch 182 notifies CTI server 184. CTI server 184 is able to determine that this call is associated with the second connection ID because it terminates at the specified CDN. It then causes switch 182 to route the call to the DN associated with the selected agent (step 292). CTI server 184 may also optionally notify routing server 192 that routing associated with the second connection ID is completed.

As a result of the above described operations, routing server 192 can route calls to agents located in all the call centers. Consequently, the resource of all the call centers can be fully utilized.

The invention has been described with reference to specific exemplary embodiments thereof Various modification and changes may be made there unto without departing from the broad spirit and scope of the invention. The specification and drawings are, accordingly, to be regarded in an illustrative rather than a restrictive sense; the invention is limited only by the provided claims.

What is claimed is:

1. A system for routing telephone calls from a network-level routing station to individual ones of a plurality of call centers, said system comprising:

a call-center-level computer telephony integration (CTI) server in each call center monitoring and controlling a telephony switching apparatus;

a network-level routing station including a network level stat-server at the network station, the stat-server storing status information related to all of the telephony switches;

a data network separate from telephony trunks between the call centers and the network-level routing station, the separate data network interconnecting the network-level routing station and the call-center-level CTI servers; and a network level router using the stored status information in the stat-server for routing incoming calls to individual ones of the telephony switches;

wherein each of the CTI servers report status of call traffic at the connected telephony switches to the network level stat-server, and the network-level routing station routes calls to the call centers based on the information in the network-level stat-server.

2. The system of claim 1 wherein the routing station routes telephone calls received by a first call center to a second call center.

3. The system of claim 1 wherein individual ones of the telephony switches are made by different manufacturers, and wherein each CTI server is adapted to communicate with the connected telephony switch and with the network level routing station.

4. A method for managing call routing from a network-level routing station to a plurality of call centers, comprising steps of:

(a) monitoring call traffic and status at individual call switching apparatus at call-centers by call-center-level computer telephony integration (CTI) servers;

(b) reporting the call traffic and status information to a network-level routing station connected to the call-center-level CTI servers by a data network separate from telephony trunks interconnecting the network-level station and the call centers;

(c) storing the call status and traffic information at a network-level stat-server within the network-level routing station; and (d) routing calls to the call centers based on the call traffic and status information stored in the stat-server at the network-level routing station.

5. The method of claim 4 wherein agent skills are stored in the stat-server and used in routing decisions.

* * * * *